United States Patent [19]

Jakob et al.

[11] Patent Number: 5,622,553

[45] Date of Patent: Apr. 22, 1997

[54] SUBSTANCE FOR INCREASING FRICTION BETWEEN TWO SURFACES

[76] Inventors: Bernhard Jakob, 48, Shanganagh Vale, Loughlinstown, Co. Dublin, Ireland; Michael Klemm, Schallbruch 41, D - 42781, Haan, Germany

[21] Appl. No.: 657,504

[22] Filed: Jun. 4, 1996

Related U.S. Application Data

[63] Continuation of Ser. No. 440,370, May 12, 1995, abandoned.

[30] Foreign Application Priority Data

May 14, 1994 [DE] Germany ........................... 44 17 030.0

[51] Int. Cl.$^6$ .................................................. C09K 3/14
[52] U.S. Cl. ..................... 106/36; 106/DIG. 4; 501/88; 252/315.01; 252/315.5
[58] Field of Search ................................ 501/88; 106/36, 106/DIG. 4; 252/315.01, 315.5

[56] References Cited

U.S. PATENT DOCUMENTS

| | | | |
|---|---|---|---|
| 2,787,967 | 4/1957 | Nohejl | 104/307 |
| 3,434,998 | 3/1969 | Aldrich et al. | 106/36 |
| 3,652,348 | 3/1972 | Baum | 149/36 |
| 3,656,522 | 4/1972 | Ingimarsson | 106/36 |
| 3,816,086 | 6/1974 | Ceremsak et al. | |
| 3,878,147 | 4/1975 | Craven | 523/150 |
| 4,234,432 | 11/1980 | Tarpley, Jr. | 252/8 |
| 4,778,730 | 10/1988 | Zucker | 428/552 |
| 5,062,895 | 11/1991 | Pockrandt | 106/36 |

OTHER PUBLICATIONS

Advertisement Screw Grab 1993 (Carol Wright Gifts) no month.
Brochure ScrewGrab (Sep. 8, 1992).

*Primary Examiner*—Mark L. Bell
*Assistant Examiner*—Louis M. Troilo
*Attorney, Agent, or Firm*—Robert W. Becker & Associates

[57] ABSTRACT

A substance for increasing friction between two surfaces such as two metallic surfaces has a gel base material determining the viscosity of the substance and contains hard crystals mixed into the gel based material. A plurality of the hard crystals is comprised of a first particles of the first substantially identical particle size and second particles of the second substantially identical particle size. The first and second particle sizes have a fixed ratio relative to one another.

7 Claims, 2 Drawing Sheets

SUBSTANCE FOR INCREASING FRICTION BETWEEN TWO SURFACES

This application is a continuation of application Ser. No. 08/440,370 filed May 12, 1995, now abandoned.

BACKGROUND OF THE INVENTION

The present invention relates to a substance for increasing friction between two surfaces, especially to metallic surfaces.

Screws have the tendency, because they are usually comprised of relatively soft metals, to exhibit, after multiple fastening and loosening actions with screw drivers, wrenches, etc. to fraying at the tool contact surfaces. Such a screw can not be loosened even with exactly machined and precisely ground tools because the tool contact surfaces of the screw do not provide sufficient securing action anymore. When such a problem occurs for a frozen screw, the only possibility for removing the screw is to drill it out whereby the parts that are connected by the screw are often also damaged.

For solving the previously described problem it is known to apply pastes with which the friction between the contact surfaces between tool and screw etc. can be increased. Such known pastes however only exhibit a substantial advantage when the tool contacting surfaces of the screw etc. have not been damaged to a greater extend. For tool contacting surfaces that have been damaged greatly, these known pastes are no longer able to provide the required grip or friction for a secure action of the tool.

It is therefore an object of the present invention to provide a substance of the aforementioned kind with which an extremely great friction between surfaces and especially metallic surfaces can be achieved.

SUMMARY OF THE INVENTION

A substance for increasing friction between two surfaces according to the present invention is primarily characterized by:

A gel base material determining the viscosity of the substance; and

Hard crystals mixed into the gel base material, wherein a plurality of the hard crystals is comprised of first particles of a first substantially identical particle size and second particles of a second substantially identical particle size, wherein the first and the second particle sizes have a fixed ratio relative to one another. Preferably, the fixed ratio is even-numbered.

Advantageously, the fixed ratio of the first particle size to the second particle size is 2 to 1.

Expediently, the first particle size is greater than the second particle size and the first particle size is in the range of 125 micrometers to 720 micrometers.

Advantageously, the hard crystals are silicon carbide particles.

In a preferred embodiment of the present invention the silicon carbide particles are present in the substance in an amount of 20 weight % to 60 weight %.

Advantageously, the substance further comprises a colorant in an amount of 0.5 weight % to 5 weight %.

In yet another embodiment of the present invention the substance for increasing friction between two surfaces, especially two metal surfaces, comprises a gel base material determining the viscosity of the substance and silicon carbide particles present in the substance in an amount of 20 weight % to 60 weight %.

Preferably, a plurality of the silicon carbide particles is comprised of first particles of a first substantially identical particle size and second particles of a second substantially identical particle size, wherein the first and the second particle sizes have a fixed ratio relative to one another.

Expediently, the fixed ratio of the first particles size to the second particle size is 2 to 1.

Advantageously, the fixed ratio is even-numbered.

Preferably, the first particle size is greater than the second particles size and the first particle size is in the range of 125 micrometers to 750 micro meters ($\mu$m).

Advantageously, the substance further for the comprises a colorant in an amount of 0.5 weight % to 5 weight %.

In yet another embodiment of the present invention a substance for increasing friction between two surfaces comprises 20 weight % to 60 weight % of silicon carbide particles, 1.2 weight % to 15 weight % of a gel base material, and 35 weight % of 75 weight % of water.

Expediently, the silicon carbide particles comprise first particles of a first substantially identical particle size and second particles of a second substantially identical particle size, wherein the first and the second particle sizes have a fixed ratio relative to one another. Preferably, the fixed ratio is even-numbered.

Preferably, the first particle size is greater than the second particle size and the first particles and second particles are mixed in a mixing ratio of 1:1 to 1:2.

Advantageously, the substance further comprises a colorant in an amount of 0.5 weight % to 5 weight %.

It is thus suggested according to the present invention to provide a gel base or paste-like base material which determines the viscosity of the substance containing hard crystals whereby the plurality of the hard crystals are comprised of a first group with substantially identical particle size and a second group with substantially identical particle size and wherein the particle size of both groups has a fixed ratio relative to one another which is preferably even-numbered.

Experiments have shown that the use of such different particle sizes results in a substantial increase of the frictional resistance between the metallic surfaces. The reason for this is that the differently sized particles of both groups match one another extremely well and thus result in a wedging action relative to one another.

This effect is especially noticeable when hard crystals made of silicone carbide are used. The crystals have hexagonal crystal structure which more than any other crystal structure makes possible a matching and thus wedging of the individual granules so that between the surfaces high frictional forces are possible. An optimal effect is achieved when the weight percentage of the silicon carbide is between 20 and 60 weight % (wt-%).

It is furthermore suggested that a substance be used which is comprised of a gel-type or paste-type base material component which determines the viscosity of the substance as well as silicon carbide crystals in an amount of 20 weight % and 60 weight % imbedded in the gel-type or paste-type base material.

The wedging effect between the metallic surfaces in this embodiment is already achieved by using the especially hard and gripping silicon carbide granules of a hexagonal crystal structure. An additional advantage is that according to a preferred embodiment the substance is comprised of silicon carbide crystals of a first group with substantially the same particle size and a second group of substantially the same particle size and that the particle sizes of both groups have a fixed ratio relative to one another, preferably an even numbered ratio. In this case the use of two particle groups of different particle size results in an especially good wedging of the individual crystals because the hollow spaces formed between the greater particles can easily be filled by smaller particles of the other group so that the effect of wedging of the crystals takes place which, in turn, results in an increase of the frictional forces acting between the surfaces in question.

According to a further embodiment of the invention it is suggested that the particle size of the larger hard crystals is between 125 and 750 micro meters. This particle size range has proven to be especially useful for application of the substance in connection with hand tools such as screw drivers, wrenches, etc.

It is especially advantageous when the hard crystals of the first group have a particle size ratio of 2 to 1 relative to the hard crystals of the second group which is comprised of the smaller-sized particles. When using such a ratio of particle sizes, an especially intensive and almost gap free wedging of the individual particles, respectively, crystals takes place.

Another advantageous embodiment of the substance is characterized in that a colorant in the amount of 0.5 weight % to 5 weight % is added. By adding a colorant it is possible to mark or color-code the substance in order to signal to the user the respective designated application of a particular substance. Especially, it is possible to indicate the suitability of the substance for certain matching tool and work piece combinations with such a color-coding of the substance.

According to yet another embodiment of the present invention a substance, especially suitable as a friction-increasing substance between metallic surfaces, is suggested which is characterized by the following composition:
1. silicone carbide crystals 20–60 weight %
2. gel base material 1.2–15 weight %
3. water 35 to 75 weight %.

BRIEF DESCRIPTION OF THE DRAWINGS

The object and advantages of the present invention will appear more clearly from the following specifications in conjunction with the accompanying drawings, in which.

DESCRIPTION OF PREFERRED
EMBODIMENTS

The present invention will now be described in detail with the aid of several specific embodiments utilizing FIGS. 1 and 2.

Figure 1:
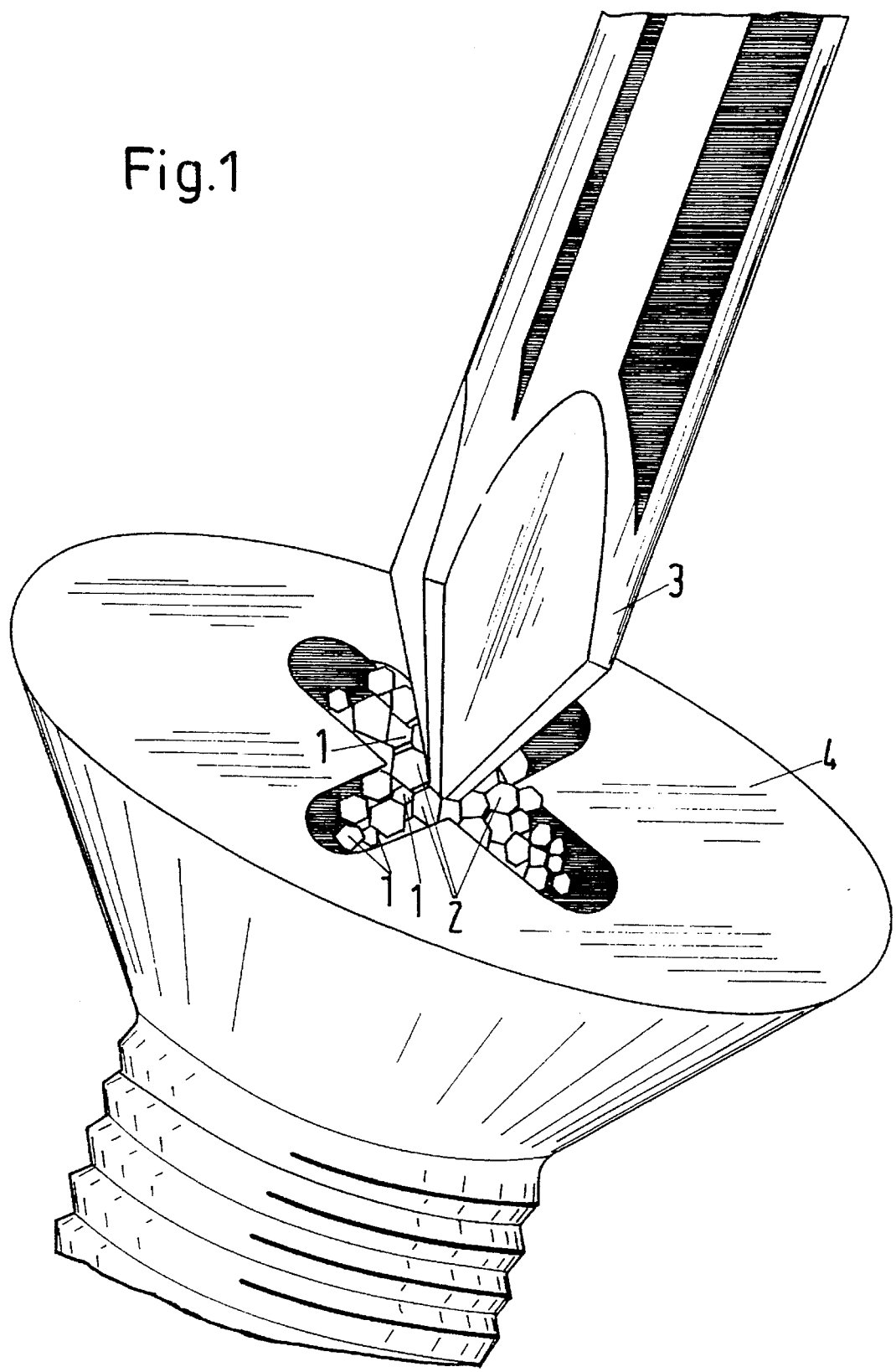
FIG. 1 shows in a perspective representation the head of a Phillips-type screw and the blade of a Phillips-type screw driver with the inventive substance filled into the head of the Phillips-type screw whereby the crystals of the substance are represented at an enlarged scale.
Figure 2:
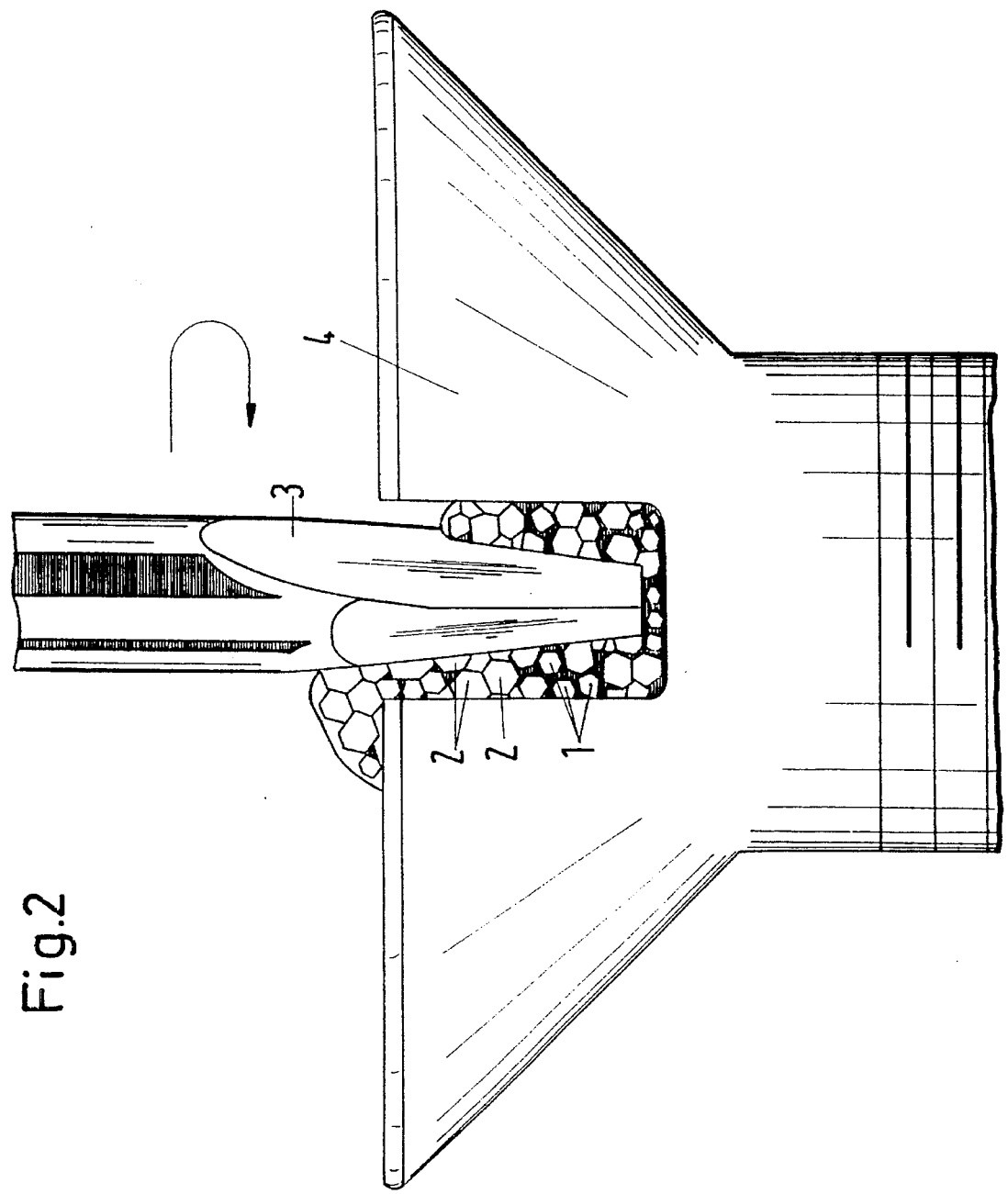
FIG. 2 shows a perspective representation of the head of a slotted head screw as well as the blade of a straight blade screw driver with the inventive substance introduced into the slotted head of the screw and with the crystals in the substance being represented at an enlarged scale.

The cross-shaped slot of the Phillips-type screw represented in FIG. 1 no longer has the required sharp edges in order to provide sufficient contact surfaces for the blade of the screw driver positioned above. Before applying the tool, the gel-type or paste-like substance of the present invention which contains crystals of silicon carbide is thus introduced into the slotted hole of the screw. In FIGS. 1 and 2 the silicon carbide crystals contained within the paste or the gel are represented enlarged. It is indicated in the drawing that the crystals have a hexagonal structure whereby the crystals are of different sizes.

A first group of silicon carbide crystals comprises relatively small crystals 1 while the second group of silicon carbide crystals comprises substantially larger crystals 2. The particle size of the crystal 2 is approximately twice as large as the particle size 1. This particle size distribution in cooperation with the hexagonal crystal structure results in an extensive wedging between the individual crystal particles so that, as especially shown in FIG. 2, between the metallic surfaces of the tool 3 and the work piece 4 (screw) a great packing density of the crystal particles results. The smaller particles 1 are lodged within the hollow spaces created between the greater particles 2. This effect is especially intensive when the particle size ratio between the two groups of crystals is 2 to 1. The desired wedging of the individual crystals can however also be achieved when the size of the greater crystals is in even-numbered multiple of the size of the smaller crystals. The mixing ratio between the crystals of the group with greater particle size and the crystals of the group with smaller particle size is preferably between 1—1 and 1–2.

In order to provide the required consistency for a drop-wise application, to this substance water is used as a base which together with a gelling agent result in the desired viscosity so that a gel or a paste results. Preferably, a gelling agent based on bentonite can be used whereby colorants can be added in order to color-code the substance for the desired application.

When a gel-type mixture is used in order to increase the grip of hand tools and especially of screw drivers, very good results can be achieved when the crystals of larger particle size have diameter of approximately 5 to 750 micrometers. The corresponding diameter of the particles of the smaller particle size are 60 to 375 micrometers. These size ranges are derived from measurements according to DIN (German Industrial Standard) 69101.

An inventive substance is preferably characterized by the following composition:
1. Silicon carbide crystals 20–60 weight %
2. Gelling agent (bentonite) 1.2–15 weight %
3. Water 35–75 weight %.

The gelling agent to be used and is preferably selected to be bentonite which is readily swellable with water and has a highly thixotropic gelling effect. It prevents the sedimentation of heavy pigment-filling materials and produces within the aqueous system a flow limit so that the desired non-dripping characteristics of the inventive substance can be obtained. The substance can thus also be used for overhead applications.

The present invention is, of course, in no way restricted to the specific disclosure of the specification, examples, and drawings, but also encompasses any modifications within the scope of appended claims.

What we claim is:

1. A substance for increasing friction between two surfaces, said substance consisting of 20 wt.-% to 60 wt.-% of silicon carbide particles, 1.2 wt.-% to 15 wt.-% of bentonite, and 35 wt.-% to 75 wt.-% of water.

2. A substance according to claim 1, wherein said silicon carbide particles are comprised of first particles of a first substantially identical particle size and second particles of a second substantially identical particle size, wherein said first and said second particle sizes have a fixed ratio relative to one another.

3. A substance according to claim 2, wherein said fixed ratio is even-numbered.

4. A substance according to claim 2, wherein said fixed ratio of said first particle size to said second particle size is 2:1.

5. A substance according to claim 2, wherein said first particle size is greater than said second particle size and wherein said first particles and said second particles are mixed in a mixing ratio of 1:1 to 1:2.

6. A substance according to claim 2, wherein said first particle size is greater than said second particle size and wherein said first particle size is in the range of 125 μm to 750 μm.

7. A substance for increasing friction between two surfaces, said substance consisting of 20 wt. % to 60 wt. % of silicon carbide particles, 1.2 wt. % to 15 wt. % of bentonite, 35 wt. % to 75 wt. % of water, and 0.5 wt. % to 5 wt. % of colorant.

\* \* \* \* \*